Nov. 23, 1948.  A. E. RUTTER  2,454,482
DISK PLOW

Filed Sept. 30, 1943  4 Sheets-Sheet 1

INVENTOR
Alvah E Rutter
BY
Emerson B Donnell
ATTORNEY

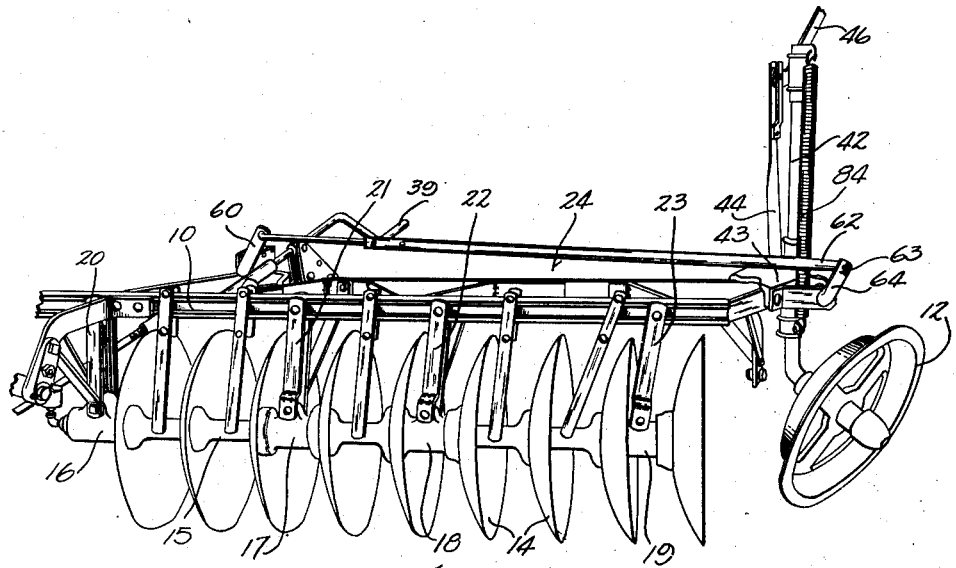
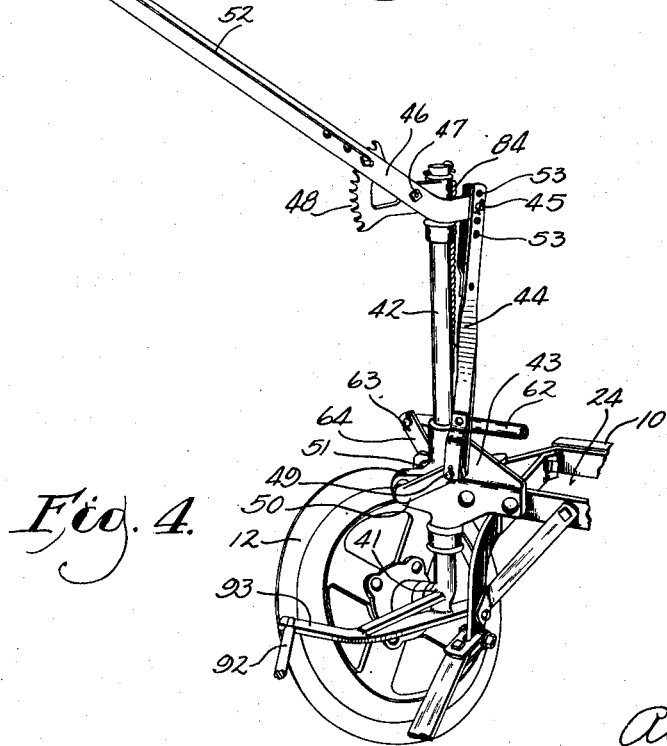

Nov. 23, 1948.     A. E. RUTTER     2,454,482
DISK PLOW

Filed Sept. 30, 1943     4 Sheets-Sheet 3

INVENTOR
Alvah E Rutter
BY
Emerson B Donnell
ATTORNEY

Nov. 23, 1948.  A. E. RUTTER  2,454,482
DISK PLOW

Filed Sept. 30, 1943  4 Sheets-Sheet 4

INVENTOR
Alvah E Rutter
BY
Emerson B Donnell
ATTORNEY.

Patented Nov. 23, 1948

2,454,482

UNITED STATES PATENT OFFICE 2,454,482

DISK PLOW

Alvah E. Rutter, Rockford, Ill., assignor to J. I. Case Company, Racine, Wis., a corporation Application September 30, 1943, Serial No. 504,427

6 Claims. (Cl. 97—53)

1

This invention relates to disk plows and an object thereof is to improve the construction and operation of devices of this class.

A further object is to improve the power lift and connections in a disk plow. A further object is to locate such mechanism further forward on the plow than has been the practice in the past. A further object is to locate such mechanism so as to provide room for a seed box, feed tubes and appurtenances commonly placed on an implement of this type.

Another object is to provide the expedients necessary for a realization of the above objects.

Further objects will become apparent from the following description and accompanying drawings in which a satisfactory embodiment of the invention is shown. However, it is to be understood that the invention is not limited to the details disclosed but includes all such variations and modifications as fall within the spirit of the invention as herein expressed.

In the drawings:

Fig. 2 is a rear elevation of the plow with parts removed taken from a point somewhat to the right.

Fig. 4 is an enlarged left side elevation of certain mechanism indicated in Fig. 3.

Figure 1:
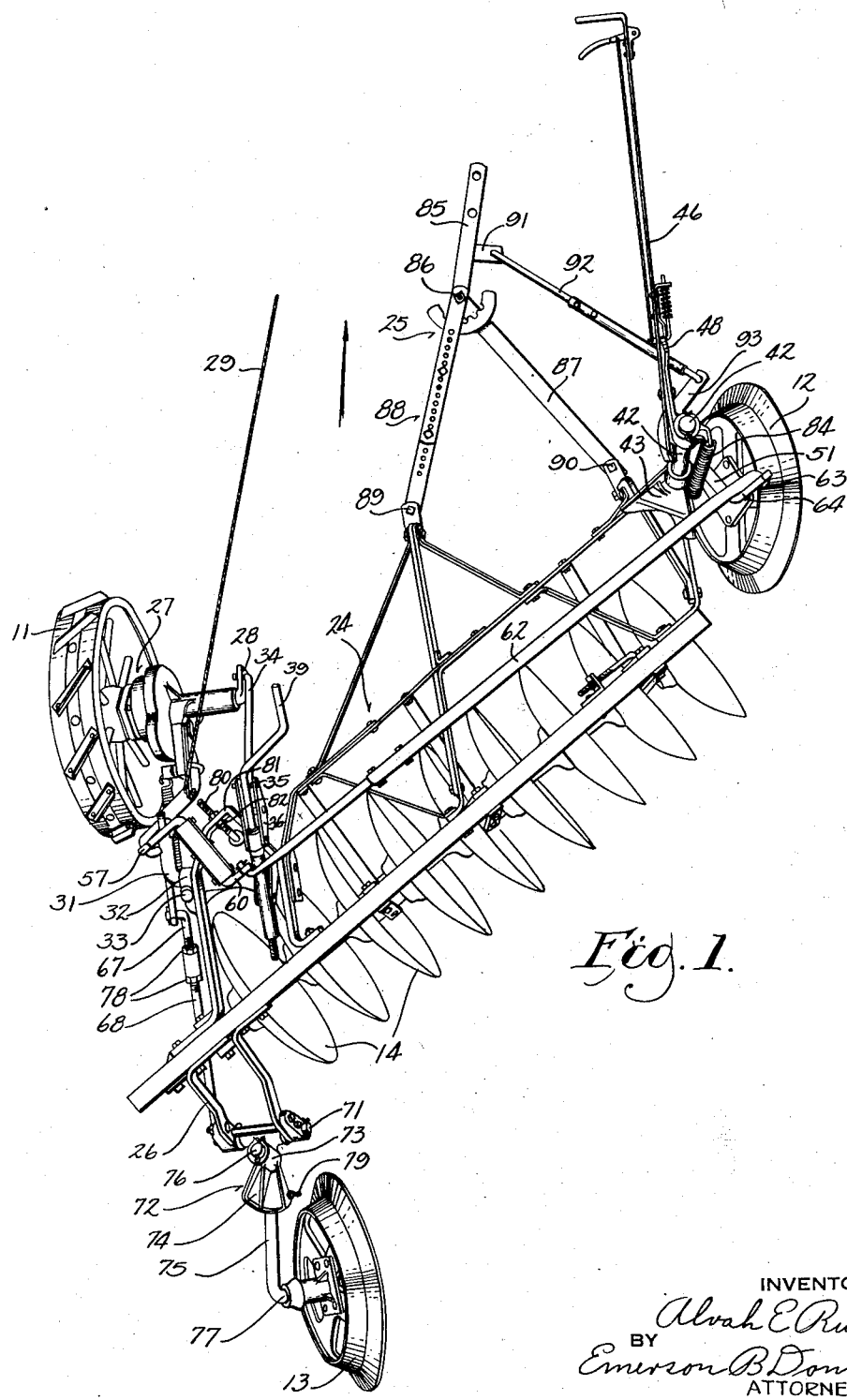
Figure 1 is a top view of a disk plow embodying the invention.

As seen in Fig. 1, the plow comprises a beam 10 supported by a land wheel 11, a front furrow or supporting wheel 12 and a rear furrow wheel 13, beam 10 being supported so as to extend in a direction oblique to the path of travel of the implement in a manner common to plows of this type. Beam 10 supports a plurality of disks 14—14 in the present instance fixed relatively to a spindle 15, suitable bearings 16, 17, 18 and 19, Fig. 2, being spaced below beam 10 by brackets 20, 21, 22 and 23 respectively and rotatively supporting spindle 15. A forwardly projecting framework generally designated as 24 connects with wheels 11 and 12 to support beam 10 therefrom. Frame 24 also connects with a draw bar structure generally designated as 25 and together with beam 10 constitutes the main frame for the machine. Wheel 13 is connected with beam 10

2 through a frame or bracket generally designated as 26.

The implement is drawn by a tractor or the like, not shown, in the direction indicated, wheel 11 running on the unplowed ground, wheel 12 running in the last previously formed furrow and wheel 13 running in the last furrow being formed at the moment. Disks 14 are therefore advanced in well-known manner in a position to slice the ground as is common in disk plows of this type.

Such implements are heavy and expedients are commonly provided for raising them by power so that disks 14 will clear the ground when it is desired to transport the implement from place to place. For this purpose in the present instance, wheel 11 is mounted on a cyclic clutch of well-known type 27 having a crank arm 28 which describes a half-turn and comes to rest in the event of a pull on a trip rope 29. This motion raises or lowers beam 10 and frames 24 and 26 relatively to wheels 11, 12 and 13, through mechanism including the several features of the invention.

Returning to Fig. 3, clutch 27 is fixed on a crank arm 30 of an axle 31 journaled in a casting 32 pivotally secured to frame portion 24 on a substantially vertical pivot 33. Casting 32 may thus be swung relatively to portion 24, in a manner to be described, to adjust land wheel 11 to run in the desired direction, while axle 31 may oscillate in casting 32 to provide for swinging of crank arm 30 for raising and lowering the plow.

Such swinging is brought about through actuation by clutch 27 of above mentioned crank arm 28, Fig. 1, the latter being connected with a normally fixed point on frame portion 24 by a link 34, so that rotation of the crank arm 28 will cause raising and lowering of frame portion 24 with consequent swinging of arm 30. The rotation of arm 28 is imparted thereto by clutch 27 from wheel 11 in well-known manner not necessary to show or describe further. This movement results in raising the implement for transport or lowering it for operation as aforesaid.

Figure 3:
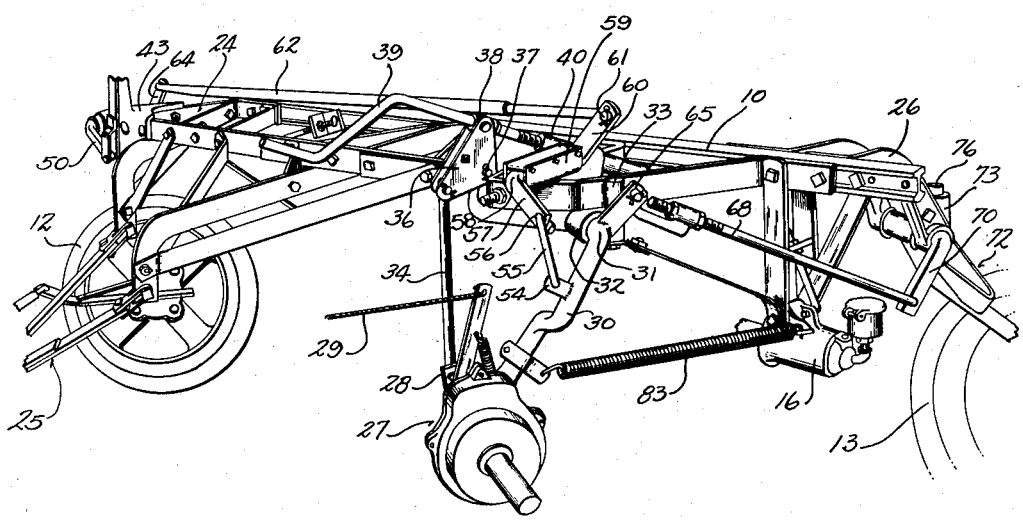
Fig. 3 is a left side elevation of the plow with parts removed.

Adjustment for plowing depth is obtained as follows. Above mentioned link 34, Fig. 3, is connected to a pivot 35 normally fixed in relation to frame 24 but adjustable. Pivot 35 is carried in the present instance in or on a bell crank 36 pivoted at 37 to the frame and having a thrust bearing 38 rockably mounted thereon and through which extends a hand crank 39. Crank 39 has a threaded portion extending into a nut element 40 rockably mounted on frame 24. Rotation of crank 39 will therefore cause approximately fore-and-aft movement of bearing 38 and rocking of bell crank 36. This in turn will cause up-and-down movement of pivot point 35 and accordingly raising and lowering of frame 34.

More properly it might be said that pivot 35 remains stationary by virtue of the engagement of wheel 11 with the ground, and rocking of bell crank 36 causes raising and lowering of point 37, and accordingly of frame 24. Thus, as will be apparent, we have a structure which is capable of substantial up-and-down movement under power for transport purposes and which can be adjusted accurately for obtaining various depths of operation.

The movement of axle 31 is transmitted to wheels 12 and 13 so that the implement will be lifted in a manner to ride level or parallel to the ground under either working or transport conditions. For this purpose, wheel 12 is journaled on a spindle portion 41, Fig. 4, of an axle 42 slidably journaled in a bearing member 43 fixed to the forward extremity of frame 24, constituting a front truck for the plow. Axle 42 is fixed in desired position against vertical sliding by means of a link 44 pivoted at 45 to a lever 46 fulcrumed at 47 to a quadrant fitting 48 journaled but fixed against axial movement on axle 42. Link 44 is pivoted at 49 to an arm 50 on a rock shaft 51 journaled in the present instance in bearing member 43 and normally held in fixed position during operation. The vertical position of axle 42 may therefore be adjusted by swinging lever 46 up-and-down, latch mechanism generally designated as 52 and of any suitable or well-know type engaging quadrant 48 to maintain the adjustment. In this manner corrective or other adjustment of wheel 12 may be accomplished. Pivot 45 has a plurality of holes 53—53 in which it may be engaged for adjustment outside the range of quadrant 48, for example to compensate for variation in size or wearing of disks 14. Shifting of pivot 49 causes raising or lowering of frame 24 for transportation or working respectively, and this is accomplished in conjunction with movement of axle 31.

Crank arm 30, as best seen in Fig. 3, has a pivot 54 connecting through a link 55, and a pivot 56, with an arm or lever 57 on a rock shaft 58 journaled in a bearing 59 fixed in any suitable manner with frame 24 and extending substantially horizontally and in a direction substantially at right angles to beam 10. Rock shaft 58 has an arm 60 extending in a generally upward direction and pivotally connected at 61 to a link or bar 62. The latter extends generally in the direction of beam 10 but forwardly thereof as clearly shown in Fig. 5. Link 62 is pivoted at 63 with an arm 64 fixed with above mentioned rock shaft 51. It will now be apparent that downward rocking of axle 31 relatively to frame 24 will cause downward movement of link 55, clockwise rotation of rock shaft 58, as seen in Fig. 3, and movement to the right of link 62. This will cause, through arm 64, Fig. 4, clockwise rocking of rock shaft 51 and downward movement of link 44 and axle 42 relatively to frame 24.

It is realized that, commonly, it is necessary for the furrow wheel on a plow, during raising movement, to go down relatively to the frame only to the extent that it is desired for the disks to clear the land in raised position. On the other hand, it is necessary for the land wheel to drop this amount plus the plowing depth for which the plow is set. This is accomplished by properly choosing the length of the arms 56, 60, 64 and 50, the location, particularly of pivot point 54, reducing the travel of the parts materially as compared with wheel 11.

Figure 5:
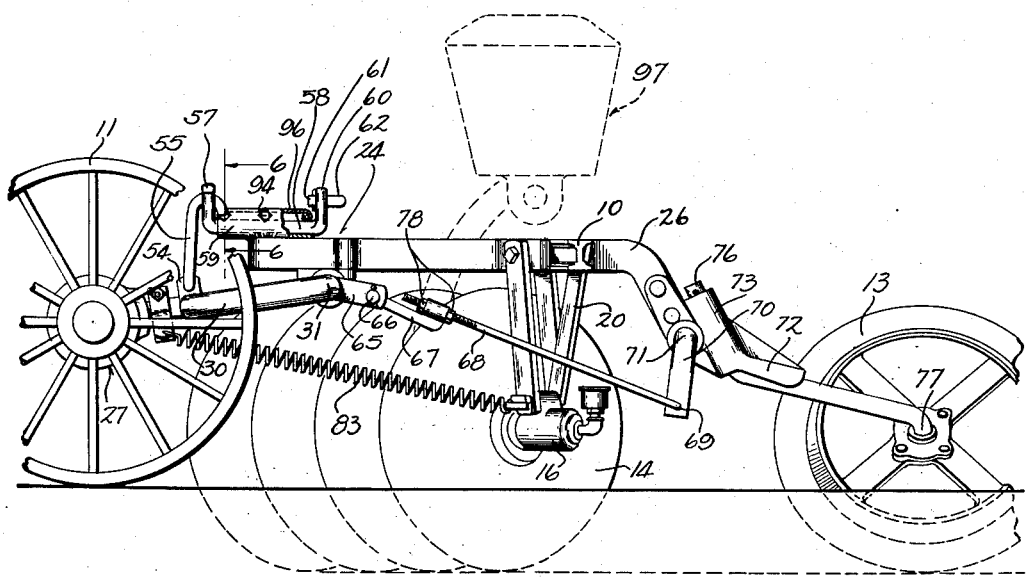
Fig. 5 is a left side view of the implement with parts removed and illustrating the application of a seed box.

Connections are provided to rear furrow wheel 13 for changing its position in accordance with shifting of axle 31. The latter has an arm 65 extending generally in a direction opposite to crank arm 30 as best shown in Fig. 5, and pivotally connected at 66 to a fitting 67 adjustably connected to a rod 68. Rod 68 is pivoted at 69 to an arm 70 on a rock shaft 71 carried in above mentioned bracket 26. Rock shaft 71 is fixed with a casting 72 or the like more particularly seen in Fig. 1 and having a bearing portion 73, and a "fish tail" portion 74. A crank axle 75 has a journal portion 76 extending in a generally vertical direction in bearing 73 for lateral swinging movement of axle 75 and a spindle portion 77 on which is journaled above mentioned wheel 13. Counterclockwise movement of axle 31 as seen in Fig. 5 (corresponding to raising movement of the plow) therefore causes a pull on rod 68 and clockwise rocking of rock shaft 71. This depresses casting 72 and accordingly axle 75 and wheel 13. The movement of wheel 13, as will be apparent, has been made less than the movement of wheel 11 since wheel 13 normally travels in the bottom of the furrow and does not need to shift relatively to beam 10 to as great an extent as land wheel 11. Furthermore, with land wheel 11 in its raised or plowing position, arm 65 and fitting 67 are substantially in dead-center relation so that small movements of the axle 31 for adjusting the plowing depth have substantially no effect on the action of axle 75 and furrow wheel 13. This is desirable since in plowing at various depths, furrow wheel 13 should remain substantially at the level of the lowest point of disks 14. In order to arrive at a suitable position of axle 75 in the first instance, rod 68 is adjustable in fitting 67 in any suitable manner as by nuts 78—78.

Axle 75 may swing laterally in casting 72 in well-known manner but is limited in its movement to the right by means of a set screw 79, Fig. 1, engaged in fish-tail portion 74 and which may be adjusted to position wheel 13 to take its proper share of the landward pressure.

Casting 32 carrying above mentioned axle 31 has a bolt 80 pivoted thereto and extending through a portion 81 of above mentioned pivot 33. In this way the angle of axle 31 may be adjusted relatively to the direction of travel of the plow for well-known reasons.

A counterbalancing spring 83 is tensioned between above mentioned thrust bearing 16 and crank arm 30 to assist in the lifting movement of clutch 27, and a second spring 84 is also tensioned between quadrant fitting 48 and bearing member 43 to assist in the lifting movement effected by above mentioned link 44. In this way the stresses in the parts are substantially reduced.

As seen in Fig. 1, draw bar 25 comprises a portion 85 pivoted at 86 to links 87 and 88 which are engaged at 89 and 90 with suitable points on above mentioned frame portion 24 in a manner well-known. Portion 85 may swing relatively to links 87 and 88 when the plow is turned and an ear 91 is pivotally connected by a link 92 to an arm 93 fixed with above mentioned axle 42. Swinging of member 85 will therefore cause swinging or steering movement of axle 42 and accordingly of front furrow or supporting wheel 12.

Link member 88 is adjustable in length for varying the line of draft as is well-known and link 92 may also be adjusted to obtain proper steering movement after adjustment of link 66. Adjustment is also provided in above mentioned link 62 in order to provide correct relations between arm 60 and arm 64.

Figure 6:
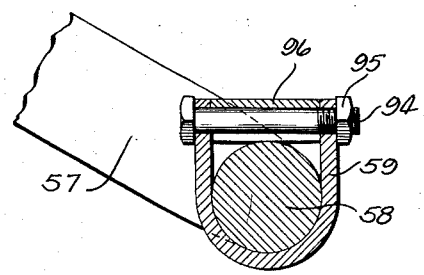
Fig. 6 is an enlarged sectional view taken substantially on the line 6—6 of Fig. 5.

Returning to a more detailed description of bearing 59, as seen in Fig. 6, rock shaft 58 is journaled in a U-shaped channel member forming the body of the bearing, the upper extremities being urged toward each other by bolts as 94 having nuts 95, the sides of member 59 being pressed against a spacer and housing plate 96. Portion 59 is welded or otherwise suitably fixed to frame 24.

It will now be apparent that expedients have been provided for realizing the objects above set forth, and it is clear from Fig. 5 that the construction locates link 62 far enough in advance of beam 10 so that there is ample room to mount a seed box and grain tube assembly 97 above disks 14 if desired, without interfering with said link and its attached parts. The operation of the implement is thought to be clear from the above description, sufficient to say that the disks 14 slice and turn over the earth in a manner common to implements of this type, wheel 12 running against the wall of the last previously formed furrow and wheel 13 running against the wall of the last furrow being formed at the moment. Wheel 11 runs on the unplowed land, the three wheels supporting and guiding the implement and disks 14 so that they may do their work under the pull of the tractor or the like coupled to draw bar 85.

A pull on trip rope 29, Fig. 1, causes clutch 27 to actuate arm 28 in a half turn thereby raising, through link 34, that portion of frame 24 to which link 34 is connected through bell crank 36.

Turning to Fig. 3, in which the raising movement has been completed, the relative downward movement of crank axle 30 pulls downwardly on link 55, rocking rock shaft 58 in a clockwise direction and pulling on link 62. This pull, as best seen in Fig. 4 (in which the frame is in the lowered position) rocks rock shaft 51 and pulls downwardly on link 44, thus sliding axle 42 downwardly through casting 43, or perhaps more properly sliding casting 43 upwardly on axle 42.

At the same time the rocking of axle portion 31 pulls on link 68, rocking rock shaft 71 and depressing fish-tail portion 72. This raises bracket 26 relatively to wheel 13. In this manner, beam 10 and frame 24 and their connected parts, are raised simultaneously at their three points of support, namely wheels, 11, 12 and 13. Another pull on rope 29 causes another half turn of arm 28 and restores the parts to the lowered position indicated in Figs. 1, 4 and 5.

The above being a complete description of an illustrative embodiment of the invention, what is claimed as new and desired to be secured by Letters Patent of the United States is:

1. In a disk plow, the combination of a beam carrying a gang of disks, a front supporting wheel, a truck connected with the wheel, raising mechanism associated with the truck for raising the beam relatively to the wheel, a land wheel, a crank axle for the land wheel and arranged to support the beam therefrom, a power lift clutch associated with the crank axle for raising and lowering the beam relatively to said land wheel, a rock shaft supported from said beam, and disposed substantially horizontally and at right angles to said beam, a connection from said rock shaft to the front truck raising mechanism, said rock shaft having an arm, and a link connection from said crank axle to said arm for rocking said rock shaft upon shifting of said crank axle for raising and lowering said beam.

2. In a disk plow having a beam, a front truck, a front supporting wheel and raising mechanism, a land wheel, a crank axle therefor, and a power lift clutch for raising and lowering the plow relatively to the land wheel and crank axle, the combination of a connection from said crank axle to said raising mechanism including a rock shaft having an arm, a link connection from said arm to said crank axle, and an arm actuating said raising mechanism, said rock shaft extending in a generally fore-and-aft direction substantially at right angles to said beam.

3. In a disk plow having a beam, a front truck, a front supporting wheel and raising mechanism, a land wheel, a crank axle therefor, and a power lift clutch for raising and lowering the plow relatively to the land wheel and crank axle; a connection from said crank axle to said raising mechanism including a rock shaft having an arm extending laterally, a link extending upwardly from said crank axle to said arm, said rock shaft having a second arm extending generally upwardly and a link pivoted to said second arm and extending in the direction of said beam, said link having a connection for actuating said raising mechanism.

4. In an implement, the combination with a frame, a front supporting wheel for said frame, a furrow wheel at the rear of said frame, a crank axle pivotally mounted at its upper end in said frame, a land wheel on the lower end of said crank axle, and means for raising said frame relative to said land wheel, of a link operatively connected with said crank axle for transmitting forward motion, a bar operatively connected at its forward end with said front supporting wheel for raising said frame relative to said wheel upon rearward movement of said bar, and a rock shaft pivotally mounted on said frame and having a laterally extending arm operatively connected with said link and an upwardly extending arm connected with said bar for transmitting rearward motion to said bar upon downward movement of said link, and a connection from said crank axle for raising said frame relatively to said rear furrow wheel in response to downward movement of said crank axle.

5. In a disk plow having a beam, a front truck, a front supporting wheel and raising mechanism, a rear furrow wheel, a land wheel, a crank axle therefor, and a power lift clutch for raising and lowering the plow relatively to the land wheel and crank axle; a connection from said crank axle to said raising mechanism including a rockshaft having an arm extending generally laterally, a link connection from said crank axle to said arm, said rockshaft also having an arm extending generally vertically, a link connection from the last mentioned arm to said raising mechanism, there being a separate and independent connection from said crank axle to said rear furrow wheel for raising and lowering said beam relatively to said rear furrow wheel.

6. In an implement, the combination of a frame, a front supporting wheel for said frame, a rear furrow wheel, a crank axle pivotally mounted at one end on said frame, a land wheel on the swinging end of said crank axle, and means for raising said frame relatively to said land wheel, a connection from said crank axle for raising said frame relatively to said rear furrow wheel, a lever mounted on said frame and swinging in a substantially vertical plane, and link means independent of said connection and extending between said lever and said crank axle and connected thereto between the pivotal mounting and the swinging end thereof, and means connecting said lever with said front supporting wheel for raising said frame relatively to said latter wheel.

ALVAH E. RUTTER.

REFERENCES CITED

The following references are of record in the file of this patent:

UNITED STATES PATENTS

| Number | Name | Date |
|---|---|---|
| 1,359,860 | Bartholomew | Nov. 23, 1920 |
| 1,395,050 | Michael | Oct. 25, 1921 |
| 1,480,341 | Biebinger | Jan. 8, 1924 |
| 1,627,902 | Holstein | May 10, 1927 |
| 1,885,955 | Silver | Nov. 1, 1932 |
| 1,957,077 | Ratigan | May 1, 1934 |
| 2,370,374 | Silver | Feb. 27, 1945 |

FOREIGN PATENTS

| Number | Country | Date |
|---|---|---|
| 111,999 | Australia | Dec. 5, 1940 |